(12) United States Patent
Petersen et al.

(10) Patent No.: US 6,409,117 B2
(45) Date of Patent: Jun. 25, 2002

(54) REEL MONITOR DEVICES AND METHODS OF USING THE SAME

(75) Inventors: Mark W. Petersen, Concord; Brian S. Witz, Greensboro; John J. McGirr, Jr.; Lance G. Gilmet, both of Clemmons; James M. Gary, Cary, all of NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/850,016

(22) Filed: May 7, 2001

Related U.S. Application Data

(63) Continuation of application No. 09/344,798, filed on Jun. 25, 1999, now Pat. No. 6,247,664.

(51) Int. Cl.[7] ........................ B65H 63/08; B65H 54/38; B65H 23/18
(52) U.S. Cl. ................................ 242/485.6; 242/485.7; 242/485.4; 242/412.3; 242/413.2; 242/484.9; 242/477.8
(58) Field of Search ........................... 242/485.6, 485.7, 242/485.4, 412.3, 413.2, 484.9, 477.7, 477.8

(56) References Cited

U.S. PATENT DOCUMENTS

| | | | | |
|---|---|---|---|---|
| 3,862,723 A | * | 1/1975 | Bonikowski | 242/413.2 |
| 4,244,539 A | * | 1/1981 | Taneda et al. | 242/478.1 |
| 4,456,199 A | * | 6/1984 | Seibert | 242/485.6 |
| 4,467,593 A | * | 8/1984 | Araki | 57/96 |
| 5,060,881 A | * | 10/1991 | Bogucki-Land | 242/413.2 X |
| 5,505,067 A | * | 4/1996 | Thomas et al. | 72/20.1 |
| 5,590,846 A | * | 1/1997 | Deckel | 242/478.2 |
| 5,791,869 A | * | 8/1998 | Lee | 415/119 |
| 5,794,869 A | * | 8/1998 | Takano et al. | 242/413.2 X |
| 5,836,532 A | * | 11/1998 | Thompson | 242/485.6 |
| 6,012,668 A | * | 1/2000 | Zurfluh et al. | 242/413.2 X |
| 6,247,664 B1 | * | 6/2001 | Petersen et al. | 242/485.6 |

* cited by examiner

*Primary Examiner*—Michael R. Mansen
*Assistant Examiner*—Minh-Chau Pham
(74) *Attorney, Agent, or Firm*—Timothy J. Aberle

(57) ABSTRACT

The present invention includes systems and methods for monitoring the spooling area of a rotatable reel for winding or unwinding an elongated material, for example, a cable. The monitoring system has a detector for sensing the presence and position of a cable surface or object or operator positioned between the detector and the reel. The detector can control rotation of the reel directly, or send a position signal to a computer where the position signal indicates the detected presence and/or position. The computer can have a memory and/or a processor for respectively storing and analyzing the position signal. The computer is operative to compare the position signal to previously received position signals to determine a condition, for example, the amount of cable on the reel, the presence of any object, and/or the existence of a safety-threatening condition. The computer can generate an output signal for use in, for example, controlling the reel speed and/or torque, or the application of brakes.

14 Claims, 8 Drawing Sheets

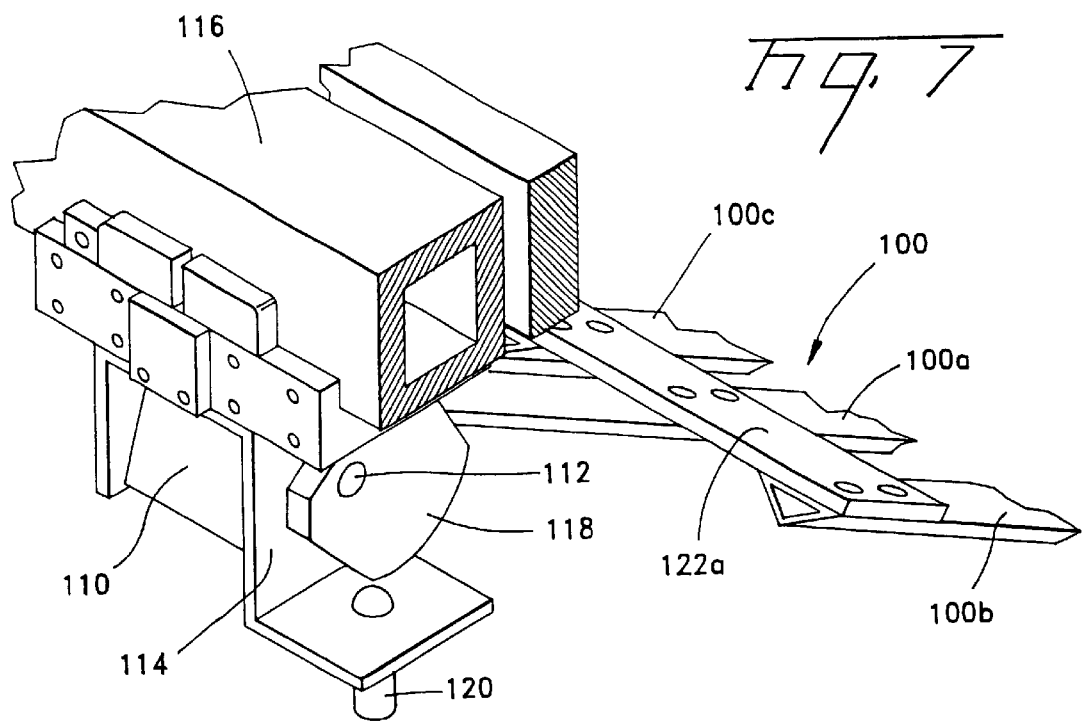
Fig. 7
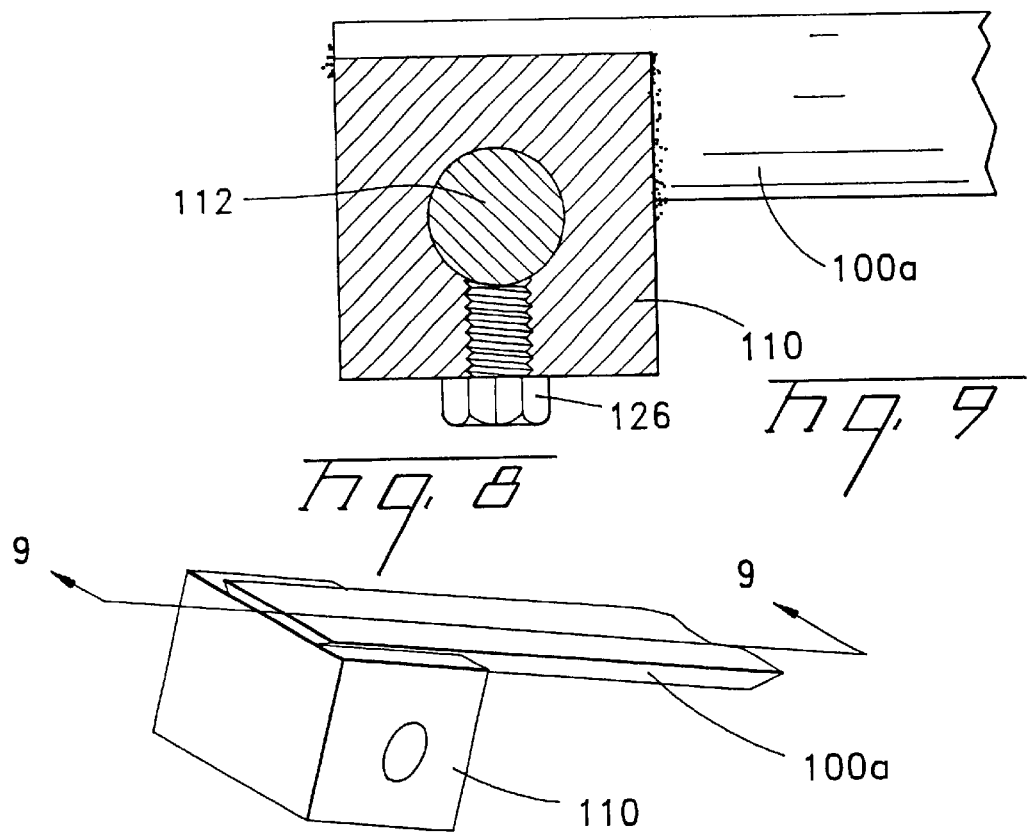
Fig. 9
Fig. 8

REEL MONITOR DEVICES AND METHODS OF USING THE SAME

RELATED APPLICATIONS

The present application is a continuation of U.S. Ser. No. 09/344,798 filed Jun. 25, 1999 now U.S. Pat. No. 6,247,664, which is incorporated herein by reference.

FIELD OF THE INVENTION

The present invention relates to devices and methods for monitoring a rotatable reel for the winding and unwinding of elongated material, for example, a cable, and more particularly, to a device and method for monitoring an area adjacent to the reel.

BACKGROUND OF THE INVENTION

Machines have been used to rotate a reel for the winding-up or paying-off an elongated material, for example, a cable. In industrial applications, the rotational speed of and torque applied to the reel can be varied throughout the winding-up or paying-off process in correspondence with the amount of cable on the reel. With a full reel of cable, each rotation of the reel equates to a greater length of cable compared to a near empty reel due to the greater diameter of cable on the full reel. To wind-up or pay-off at a constant rate, the rotational speed of the reel can decrease as the cable gets wound up or it can increase as the cable is paid-off. Also, the required rotational torque increases with the greater amount of cable on the reel. Many machines have the capability to wind-up and pay-off reels of multiple sizes, as the reels can have reel cores and reel flanges of varying diameters and axial lengths.

There can be safety issues associated with winding-up and paying-off cable from a reel, since operators typically assist in the winding-up or paying-off process. For example, when winding cable onto a reel, an operator typically loosely holds on to the cable near the reel to direct the cable on to the reel in order to insure an even cable traverse. The operator's care is required when an uneven cable traverse has occurred, since the operator is needed to redirect the cable to fill the uneven portion to compensate for the uneven traverse. As the operator redirects the cable, a safety problem can occur if the operator gets caught up with the cable as it is being wound onto the reel. If this happens, the operator may be pulled over the reel and can be injured.

There have been a number of devices designed to solve some of the safety concerns. One safety solution involves using photo-detectors to create a beam of light adjacent to the reel. This solution is unsatisfactory because a light beam directly in front of the reel may be broken by an operator during the normal winding-up or paying-off process, thereby unnecessarily shutting down operations. Also, this solution can fail to detect an operator's presence in the area between the flanges of the reel, since the light beam generator and reflector sense only the area outside of the flanges of the reel.

Another inadequate solution uses a floor mat having sensors in it for detecting the operator's presence on the mat. When the operator steps off the mat, the motor powering rotation of the reel is shut down. A disadvantage of the floor mat approach is that the reel may be traversed over the floor mat requiring the operator to move out of the way. Another solution uses photo-sensors and multiple beams of light crossing the area where the operator stands. These solutions are problematic because they restrict the position of the operator to a given area. As the operator may occasionally need to move up and down the length of cable in order to properly wind-up or pay-off the cable, restricting the position of the operator is undesirable. Further, the known solutions are impractical because they require the operator to notify/disable the system when the operator must leave the mat/sensor area. Additionally, the known solutions are not flexible enough to adjust to various reel sizes and wind-up and pay-off locations. Another disadvantage of the known safety systems is that they are not easily adjustable to guard the safety of an operator over a wide range of reel sizes.

SUMMARY OF THE INVENTION

It is an object of the present invention to provide a device for monitoring a spooling area of a rotatable reel and areas adjacent thereto and adapted for winding-up or paying-off an elongated material, the device may include: a detector for determining the presence and/or position of an object within and/or adjacent the spooling area and relative to a rotational axis of the reel, the detector adapted to output a position signal indicating the presence and/or position; a controller for determining a change in position of the object relative to the rotational axis, the controller having a memory for storing a second position signal detected at a second time and a processor for comparing the position signal to a first position signal detected at a first time and stored in the memory to determine a position change value over a time period, the time period being the difference between the first time and the second time, and the controller outputting a position change signal representative of the position change value.

It is an object of the present invention to provide a device for monitoring the area adjacent a rotatable reel adapted for winding-up or paying-off cable, the device may include: an arm longitudinally extendible into the area between flanges of the reel and displaceable relative to the rotational axis of the reel; a sensor adapted to detect the displacement of the arm and to output a position signal representative of the displacement; a controller having a memory and/or a processor, the memory adapted to receive the position signal and the processor adapted to compare the position signal to a previously-received position signal stored in the memory to determine a displacement change value, the controller operative to output a displacement change signal representative of the displacement change value.

It is an object of the present invention to provide a cable winding or pay-off device, the device may include: a frame having a first and second leg and a cross-beam connecting the top ends of each of the first and second leg; a mount affixed between each of the first and second leg, the mount adapted for releasably and rotatably securing a reel for winding or paying off cable, the reel having a core longitudinally extending between a first and second flange; a motor adapted for rotating the reel; an arm longitudinally extendible between the flanges and contactable with the reel or with the cable wound about the reel; a sensor coupled to the arm, the sensor adapted to detect the rotational position of the arm relative to the rotational axis of the reel and to output a position signal representative of the rotational position; and a controller having a memory and a processor, the memory adapted to receive the position signal and the processor adapted to compare the position signal to a previously received position signal stored in the memory to determine a rotational position change value, wherein the controller is adapted to output a position change signal representative of the rotational position change value.

It is an object of the present invention to provide a method for automatically controlling a machine that rotates a reel for winding or unwinding cable, comprising: detecting the presence and/or position of an object between the flanges of the reel relative to the rotational axis of the reel and outputting a position signal indicating the detected presence and/or position; comparing the position signal to a previously-received position signal stored in a memory of a controller using a processor associated with the controller in order to determine a position change value; and sending an output signal to the machine to stop rotation of the reel if the position change value is greater than a predetermined maximum position change value.

It is an object of the present invention to provide a device for monitoring a rotatable reel on which wound cable forms a cable surface, comprising: means for detecting and determining a first position of a first detected surface at a first detection time between the detection means and the reel; means for detecting and determining a second position of a second detected surface at a second detection time between the detection means and the reel; means for determining a change in position and a time period, wherein the change in position is the difference between the first position and the second position, and wherein the time period is the difference between the first detection time and the second detection time; and means for controlling the rotatable reel based on the change in position and the time period.

It is an object of the present invention to provide a device for monitoring a rotatable reel, the rotatable reel being operatively associated with a drive system for driving rotation of the reel, said reel having a spooling area for receiving an elongated material; and a detector, the detector being operative to detect the presence of an object at least partially in the spooling area, the detector being operatively associated with the driving system so that when the detector detects the presence of the object operation of the driving system can be controlled.

It is an object of the present invention to provide an apparatus for mounting to a machine, the machine being operative to rotate at least one rotatable reel having reel flanges, the rotatable reel being operatively associated with a drive system for driving the rotatable reel, the rotatable reel having a spooling area for receiving an elongated material, the apparatus for mounting to the machine comprising: a detector, the detector being mountable to a movable frame, the movable frame being operative to move the rotatable reel; and the detector being operative as part of a control system for the machine and when mounted adjacent the movable frame to detect the presence of an object at least partially in the spooling area.

BRIEF DESCRIPTION OF THE DRAWINGS

FIG. 7 is an isometric view of a portion of the movable mount and the upper portion of the sensing member, where the sensing member is attached to the movable mount via a bracket that also pivotally mounts a shaft attached to the sensing member, and where the bracket also mounts a proximity sensor adjacent to a cooperating cam affixed to the shaft;

FIG. 8 is an isometric view of the attachment of the sensing member to the base;

FIG. 9 is a cross-sectional view of FIG. 8 taken at line 9—9;

FIGS. 10 and 12 are partial cross-section side views of the detector assembly illustrating the relative movement of the cam and sensing member;

FIG. 13 is a flowchart of a method according to the present invention for automatically controlling a reeling machine, for example, by immediately stopping the machine.

DETAILED DESCRIPTION OF THE INVENTION

Figure 1:
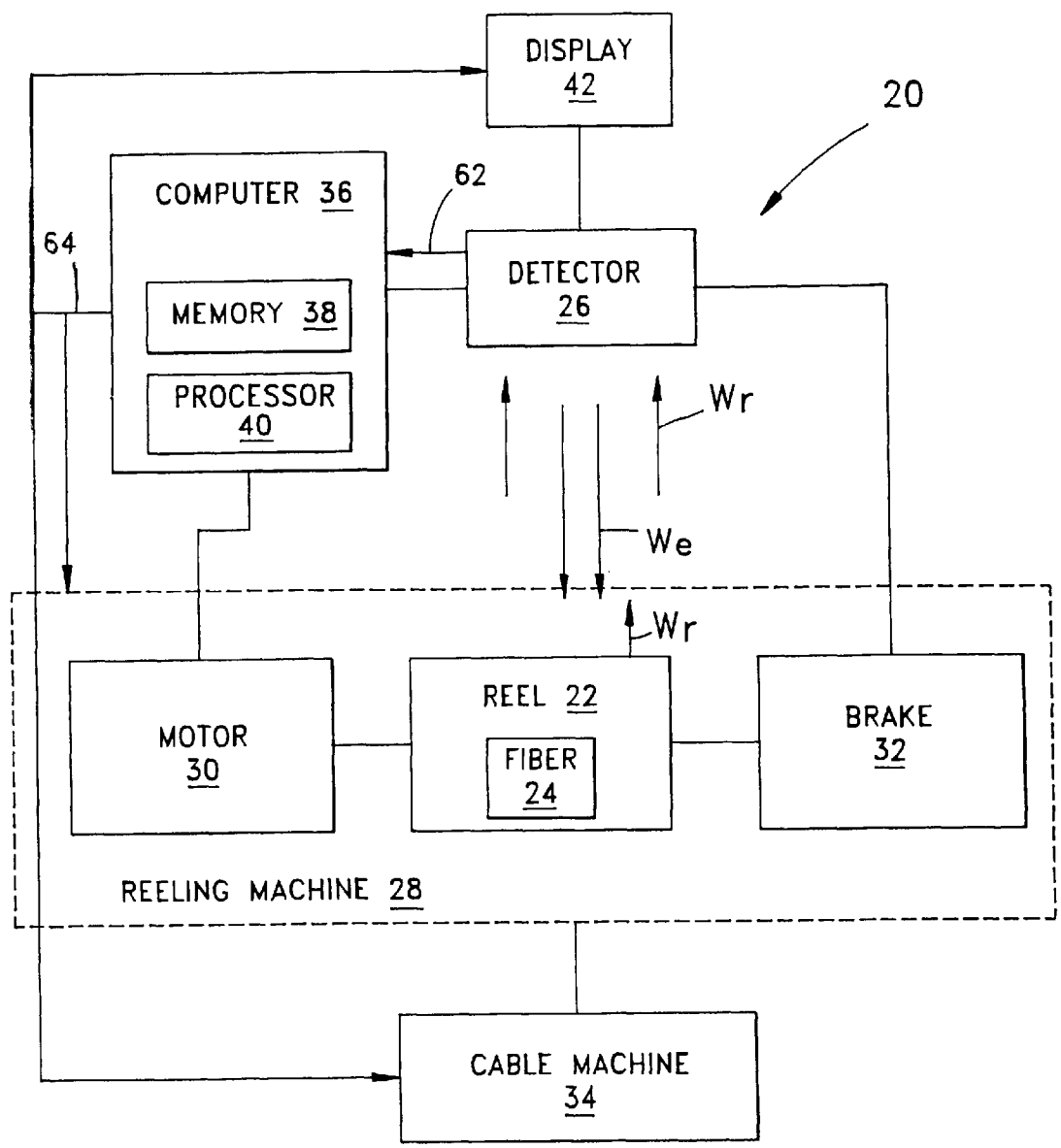
FIG. 1 is a schematic view of the monitoring system of the present invention.

Referring to FIG. 1, an overview of an exemplary embodiment monitoring system 20 according to the present invention for monitoring a rotatable reel 22 will be described. Reel 22 is operable to wind an elongate material, e.g. a cable 24. System 20 comprises a detector 26 for determining the presence and/or position of the cable surface, and/or an object and/or operator between the reel and the detector. The term "elongated material" as used herein refers to any reelable material, for example, optical fiber cable, optical fiber, electrical cables and wires, elevator cable, sheet material, rope, thread, tubing, chain, and yarn. Reel 22 is rotatably mounted to a reeling machine 28 having a motor 30 operatively associated with the reel for rotating the reel at controllable velocities and torque. Reeling machine 28 may further include a controllable brake 32 for impeding or stopping the rotation of reel 22.

Monitoring system 20 is operative to monitor and/or control the operation of reel 22. Monitoring system 20 may be associated with a cable machine 34 that is producing or utilizing cable 24 on reel 22. In addition, monitoring system 20 can be operatively associated with a computer 36, for example, a programmable logic controller. Computer 36 can have, for example, a memory 38 and/or a processor 40 for respectively storing and executing operations. For example, computer 36 can cooperate with a detector 26 to monitor and analyze the presence and/or position of an object and/or an operator between reel 22 and the detector. Computer 36 can be programmed to, for example, determine a length of cable 24 remaining on the reel and/or to determine whether a safety-threatening condition exists. By determining the length of cable 24 on reel 22, monitoring system 20 may control reeling machine 28, for example, by varying the rotational velocity and/or torque of reeling machine 28. Further, by determining a safety-threatening condition, such as the presence of an operator and/or an object between detector 26 and reel 22, monitoring system 20 may control the reeling machine 28, for example, by application of a brake 32 to immediately stop the rotation of the reel. Finally, monitoring system 20 may optionally include a display 42 for displaying data or signals from detector 26, computer 36, reeling machine 28 and/or cable machine 34, for example, information such as cable length remaining on the reel, reel rotational velocity and torque, and other system parameters.

Figure 2:
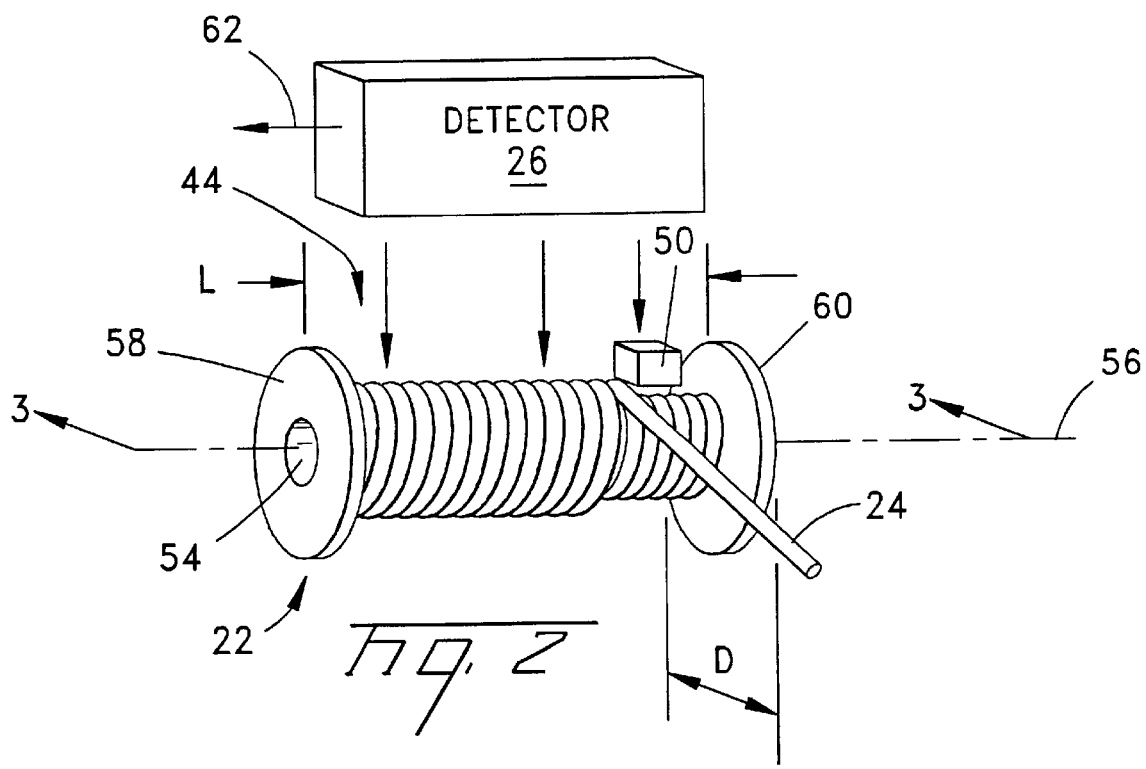
FIG. 2 is a perspective view representing the detector and reel of FIG. 1.
Figure 3:
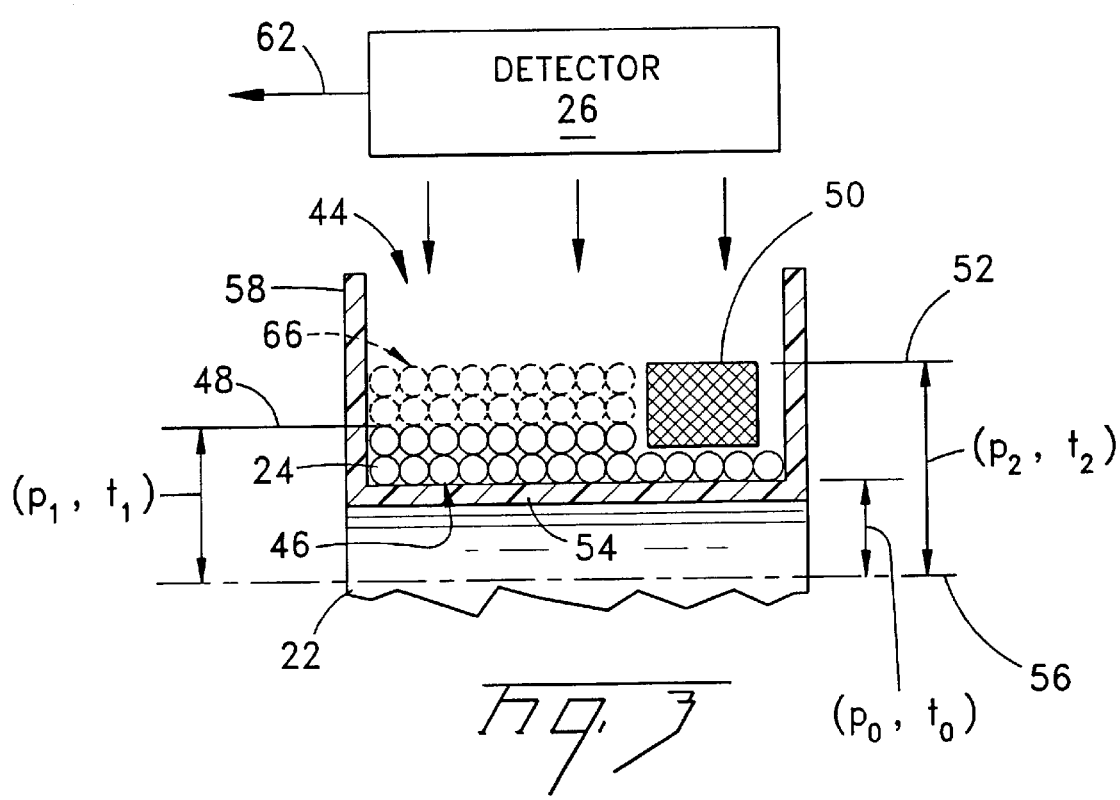
FIG. 3 is a cross-sectional view of the detector and reel of FIG. 2 along line 3—3.

Referring to FIGS. 2 and 3, detector 26 can sense the presence and/or position of objects in spooling area 44 between reel 22 and the detector. Spooling area 44 comprises a field of detection between the rotatable reel and the detector including at least part of the area between and adjacent to flanges of the reel. For example, detector 26 senses spooling surface 46 of reel 22, cable surface 48, and/or the surface of an object 50 or operator positioned anywhere between the reel and the detector. Spooling surface 46, cable surface 48, an operator, and the surface of foreign object 50, are hereinafter collectively referred to as detected surface 52. Spooling surface 46 is the surface of core 54 that longitudinally extends along axis of rotation 56 between first flange 58 and second flange 60 of reel 22. As one skilled in the art will realize, core 54 may be a solid cylinder or merely longitudinal spokes or a solid spindle. Similarly, reel 22 may have only one flange or the reel may be flangeless. Reel 22 is an exemplary device, as the present invention may be practiced on other elongated material collection devices, for example, a drum, cylinder, or a coiling device. The axis of rotation 56 can be horizontal, vertical, or at any suitable angle. Further, detected surface 52 may occupy only a portion of the longitudinal length L or transverse depth D of spooling area 44 (FIG. 2).

Typically, detector 26 can be programmed to monitor spooling area 44, generating a position signal 62 indicating the presence and/or position of detected surface 52 corresponding to a detection time. The monitoring of spooling area 44 may be performed continuously at given time intervals, or may be limited by the sampling rate of detector 26 or the processing rate of computer 36. The information contained in position signal 62 can be utilized by a control unit, for example, a computer 36 to monitor spooling area 44 and control monitoring system 20.

For instance, to determine a length of cable 24 wound-up on or paid-off from reel 22, system 20 can utilize computer 36 to compare an initial position signal with a current position signal to determine a position change value associated with a time period corresponding to the difference between detection times. Referring to FIG. 3, before initially winding any cable 24 onto reel 22, detector 26 sends an initial position signal $PS_0=(p_0, t_0)$ indicating that the detector senses spooling surface 46 ($=p_0$) at detection time $t_0=0$. In general, the position of the spooling surface 46 or any detected surface 52, may be determined, for example, relative to rotational axis 56, relative to detector 26, or relative to any other point that may be of interest for system operations. As such, $PS_0$ is received by computer 36 and stored in memory 38. After winding operations have initiated, detector 36 may send a first position signal $PS_1=(p_1, t_1)$ indicating that the detector senses cable surface 48 ($=p_1$) at detection time $t_1=1$. Computer 36 receives $PS_1$ and utilizes processor 40 to compare $PS_1$ to $PS_0$, which is retrieved from memory 38, in order to determine a position change value $\Delta p=(p_1-p_0)$ over the time period $\Delta t=t_1-t_0$. The position change value and/or time period value may be sent as output signal 64 to be converted into a video image on display 42, for example. Alternatively, position change value and/or time period value may be utilized in further processing, whereby output signal 64 includes other information that may be utilized for the control and operation of reeling and cable machines 28 and 34, for example.

Computer 36 may also retrieve other information, such as the rotational velocities of reel 22 associated with the time period between detection times, for example. Other system parameters may be periodically or continually monitored, stored, processed and/or controlled by computer 36, for example, the rotational speed of the reel, the torque applied to the reel, and/or the feed rate of the cable machine. Other programmable parameters include the diameter of the cable, diameter of the reel core, diameter of the reel flanges, longitudinal length of the reel between the flanges, the size of the elongate material, and/or the quantity of material on the reel. Computer 36 can be programmed to determine the length of cable 24 on reel 22 by performing a calculation using, for example, the difference in position of the detected surfaces, the distance between the detected surfaces and the axis of rotation, the diameter of the cable, and the average rotational velocity.

As an illustration, to detect a safety-threatening condition, system 20 can utilize computer 36 to compare a detected surface, or a difference in positions between detected surfaces, to expected or threshold values. For example, if foreign object 50 is positioned anywhere between reel 22 and detector 26, the detector sends to computer 36 second position signal $PS_2=(p_2, t_2)$ indicating that the detector senses detected surface 52 ($=p_2$) at detection time $t_2=2$. Computer 36 may then compare $PS_2$ to a previous signal, such as $PS_1$, to determine the change of position value $(p_2-p_1)$ for the time period $(t_2-t_1)$. A safety threshold value, $p_s$, such as a maximum or minimum change of position value, may be predetermined and stored in memory 38 or otherwise communicated to computer 36 for performing a safety analysis. Computer 36 may send output signal 64 for controlling the machine by, for example, controlling the speed of motor 30 and/or applying brake 32 if the change of position value $(p_2-p_1)$ equals or exceeds the safety threshold value. In a like manner, computer 36 may utilize other system parameter information to monitor spooling area 44. For example, computer 36 may compare time period $(t_{2e}-t_1)$ corresponding to position change value $(p_2-p_1)$ to an expected time period $(t_2-t_{1e})$ based on the normal operating conditions. The expected time period is the normal amount of time it takes to achieve such a position change, i.e., to build up layers 66 of cable around reel 22 corresponding to $p_2$, given the rotational velocity of the reel during the time period and the diameter of the cable. Computer 36 may send a controlling output signal 64 to motor 30 and brake 32 if the detected time period $(t_2-t_1)$ is substantially less than the expected time period $(t_{2e}-t_{1e})$. Thus, system 20 can monitor and control the operation of reel 22 to, for example, minimize safety hazards.

Detector 26 may be any system that is able to sense the presence and position of a surface or object on or adjacent to reel 22. For example, detector 26 can be operative to emit and/or receive wave energy, for example, in the form of light or sonic energy for sensing the presence of an object generally in the spooling area. As shown in FIGS. 1–3, detector 26 emits a wave $W_e$ that we can reflect off the object as $W_r$ and be detected by detector 26. Waves $W_e$, $W_r$ can be transmitted and/or received at normal, acute, or oblique angles with respect to any reference line, for example, the axis of rotation of the reel. Suitable examples of detector 26 include mechanical and/or electromechanical systems, ultrasonic systems, photoelectric systems, and/or vision systems. For example, an ultrasonic detector may include a generator for sending an ultrasonic wave, a receiver for receiving ultrasonic waves reflected from a surface or object, and a processor for computing the position signal. A photoelectric detector may include a light source for generating a light wave, a reflector for reflecting the light wave, a receiver for receiving the reflected light, and a processor for computing the position signal. A vision system detector may include an electronic camera for obtaining a video image and a frame grabber for digitizing the video image and outputting the digitized image as the position signal. Further, numerous mechanical and/or electromechanical detectors may be utilized, such as those including proximity sensors, and/or capactive switches. Computer 36 may be a separate component of system 20, or it may be integrated into one or more system component, such as detector 26, reeling machine 28, and cable machine 34. Suitable examples of computer 36 include personal computers, processors, microprocessors, hard-wired processors or controllers such as a programmable logic unit, servers, mainframe computers, and computer workstations.

Reeling machine 28 may be any device utilized to wind-up or pay-off cable 24 from reel 22. Suitable examples of reeling machine 28 include machines made by NEXTROM or, for example, a Skaltek® UX26 or UX28 Take-Up Stand. Cable machine 34 may be any machine that produces or utilizes cable 24. Suitable examples of cable machine 34 include pay-off machines, stranding machines, extruders, or winders.

Figure 4:
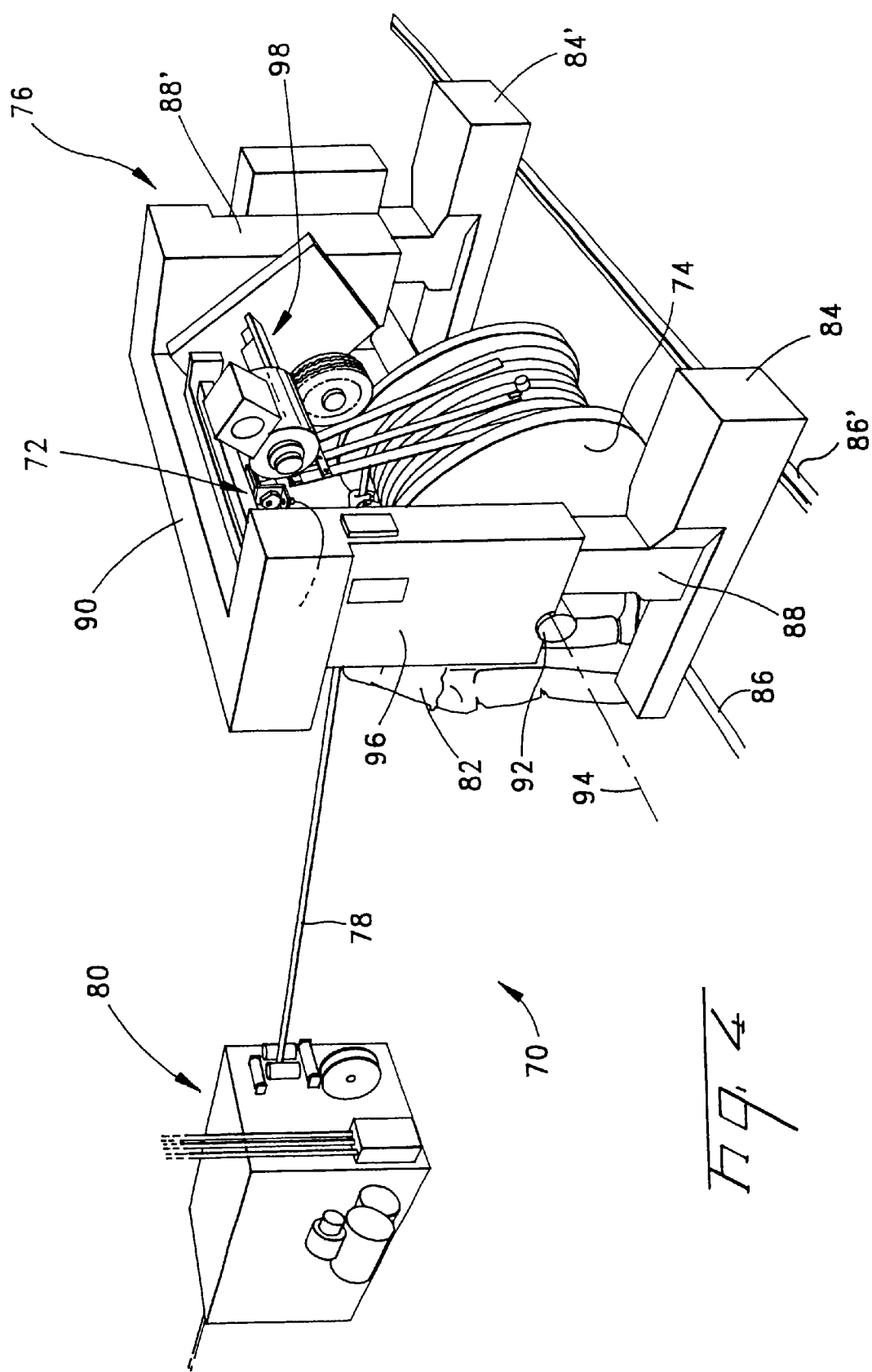
FIG. 4 is an overall perspective view of a monitoring system including a reeling machine incorporating a detector assembly according to the present invention.

In another exemplary embodiment of the present invention, referring to FIG. 4, monitoring system 70 includes detector assembly 72 for monitoring reel 74, which is mounted on reeling machine 76 and receives cable 78 from cable machine 80. Operator 82 tends to the lay of cable 78 onto reel 74. For example, cable machine 80 may be an extrusion jacket line for producing loose tube fiber optic cable, and reeling machine 76 may be a Skaltek® UX28 Take-Up Stand. Reeling machine 76 includes a movable frame having, for example, base members 84 and 84', movable along rails 86 and 86', supporting upright members 88 and 88' that are connected by head beam 90. During operation, reeling machine 76 may translate back and forth along rails 86 and 86' in correspondence with the traverse of cable 78 onto or off of reel 74. Reel 74 is rotatably supported by mounting mechanism 92 connected to upright members 88 and 88'. Mounting mechanism 92 includes mounts such as a shaft or opposed pins, for example. Upright members 88 and 88' may be adjustable such that the height of mounting mechanism 92, and hence the height of axis of rotation 94, may be varied to accommodate different sized reels. Further, reeling machine 76 includes programmable logic controllers (PLC) 96 in communication with motor 98, having an integral brake, and detector assembly 72 for monitoring the area adjacent to reel 74 and controlling the rotational velocity and torque applied to reel 74.

Figure 5:
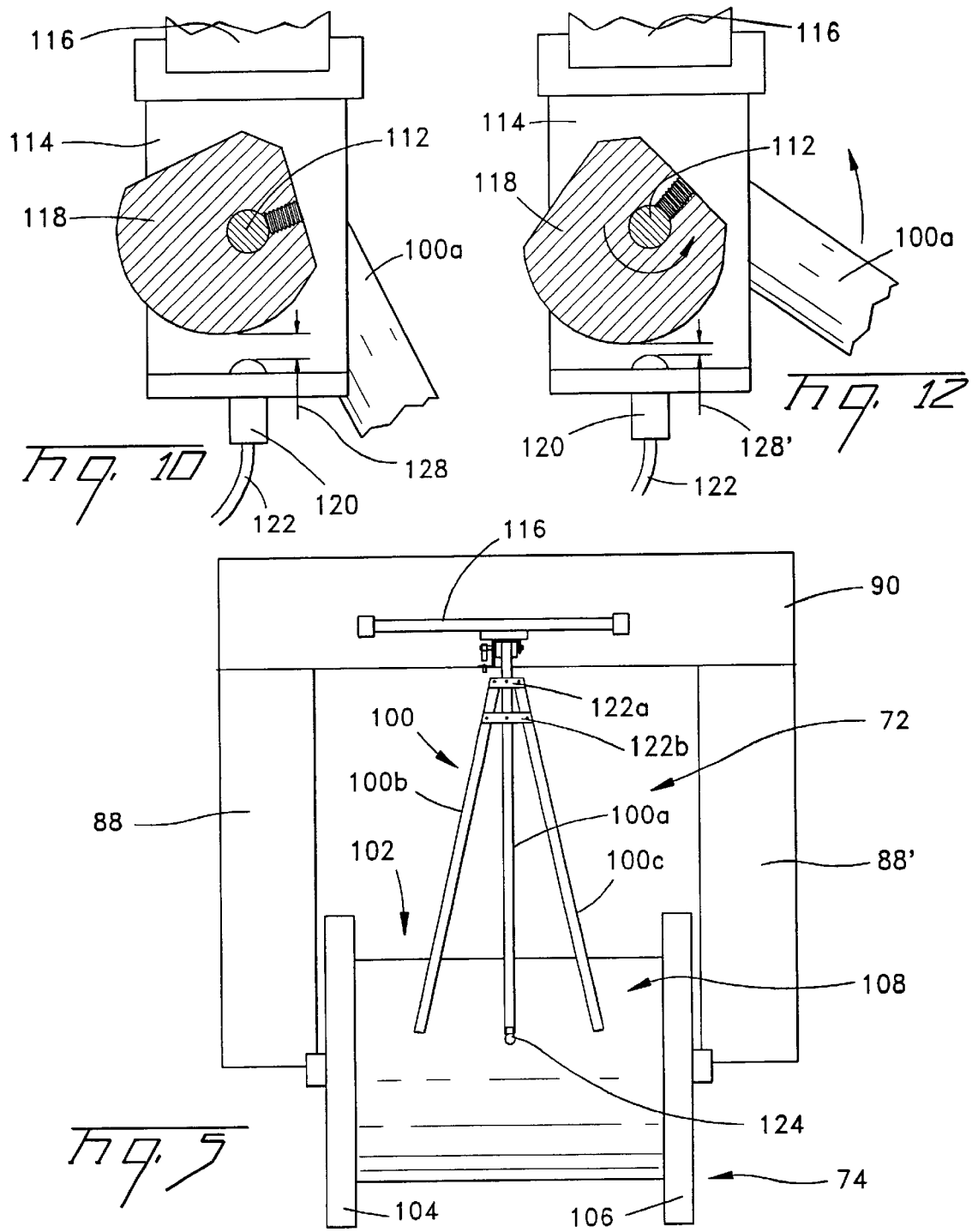
FIG. 5 is a diagrammatic view illustrating the relative position of the sensing member of the detector assembly mounted on a movable mount and laying against the core of the reel.
Figure 6:
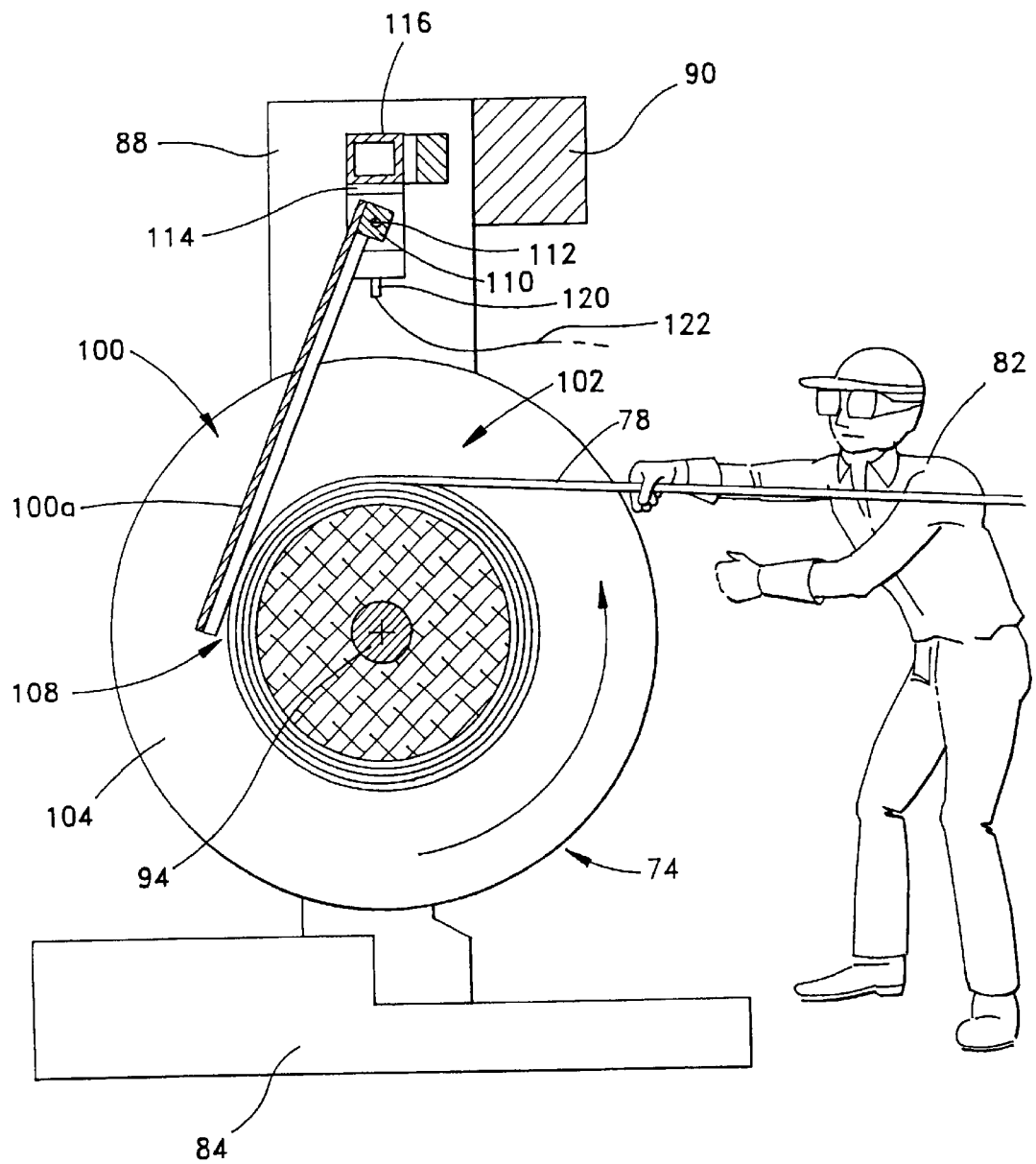
FIG. 6 is a side view of an operator assisting in the laying of a cable on a reel.

Referring to FIGS. 5 and 6, detector assembly 72 includes a projection, for example, a sensing member 100 that projects generally towards spooling area 102. Sensing member 100 can preferably contact surface 108, such as the reel core surface or the surface of wound cable or the surface of an object. Sensing member 100 can be biased in contact with surface 108, such as by gravitational force and/or a spring biasing device, for example, to substantially reduce or prevent jumping and bouncing of the sensing member against surface 108. Sensing member 100 can cover a substantial portion of the axial and/or radial length of the reel or cable surface 108, and preferably is able to detect the surface, or object between the sensing member and the surface, along multiple points of the axial length of spooling area 102. Sensing member 100 may comprise projection assemblies and components, for example, a sheet of material, and/or arm-like members. Suitable materials for sensing member 100 include metals, plastics, composites, and other durable, semi-rigid or flexible materials having relatively smooth finishes that will not harm the operator or cable.

Referring to FIGS. 5–7, detector assembly 72 can include a movable carriage. The movable carriage can support sensing member 100. Sensing member 100 can include a base 110 coupled to a shaft 112, which is rotatably mounted within bracket 114 such that sensing member 100 is permitted to move relative to surface 108 to accommodate varying amounts of cable 78 on reel 74 or objects or operators positioned between the reel and the sensing member. Bracket 114 can be attached to a movable mount 116, which is affixed to a head beam 90 but which allows translation of detector assembly 72 in the direction of arrow A (FIG. 5). Movable mount 116 can include a motion actuating device, for example, a pneumatic rodless cylinder. A motion actuating device can be applied in any embodiment of the present invention, for example, for the purpose of controlling the position of the detector as needed to accommodate different reel sizes. Additionally, detector assembly 72 includes cam 118 (FIG. 7) and proximity sensor 120, which sends a position signal through cable 122 to PLC 96 based on the orientation of the cam. Cam 118 is coupled to shaft 112 and rotates with the displacement of sensing member 100 relative to reel 74. Also, sensing member 100 is substantially rigid, such that displacement of the far end of sensing member that is adjacent to reel 74 does not substantially bend or distort the sensing member relative to the opposite end. In this manner, the interaction of any portion of sensing member 100 with the spooling surface, the cable surface or object is translated to the whole of sensing member 100 and can therefore be measured by proximity sensor 120. Thus, the position signal sent by proximity sensor 120 to PLC 96 corresponds to the displacement of sensing member 100 and can thereby be utilized to monitor spooling area 102, for example, to determine cable length or to detect safety-threatening conditions.

In one particular embodiment of the present invention, referring to FIGS. 5 and 7–9, sensing member 100 can include a central member 100a connected to secondary members 100b and 100c through brackets 122a and 122b. Secondary members 100b and 100c are angularly positioned relative to central member 100a to increase the axial length of coverage of sensing member 100 within spooling area 102. The far end of central member 100a can include a hook member 124 that can be hooked by a pole or stick for moving sensing member 100 in and out of position within spooling area 102 to a storage bracket (not shown) mounted to upright member 88 or 88' or head beam 90. Further, referring to FIGS. 5 and 6, sensing member 100 can comprise, for example, a triangularly-shaped in cross-section. Sensing member 100 can comprise various geometrical shapes, for example, flat or arcuate, but it should have a leading edge for allowing the sensing member to smoothly slide over the cable. Central member 100a may be affixed to base 110. For example, central member 100a and base 110 may be connected in several planes. Further, base 110 may be permanently or removably fixed against rotation on shaft 112 by securing device 126, such as a set screw, welding or other method.

Figure 11:
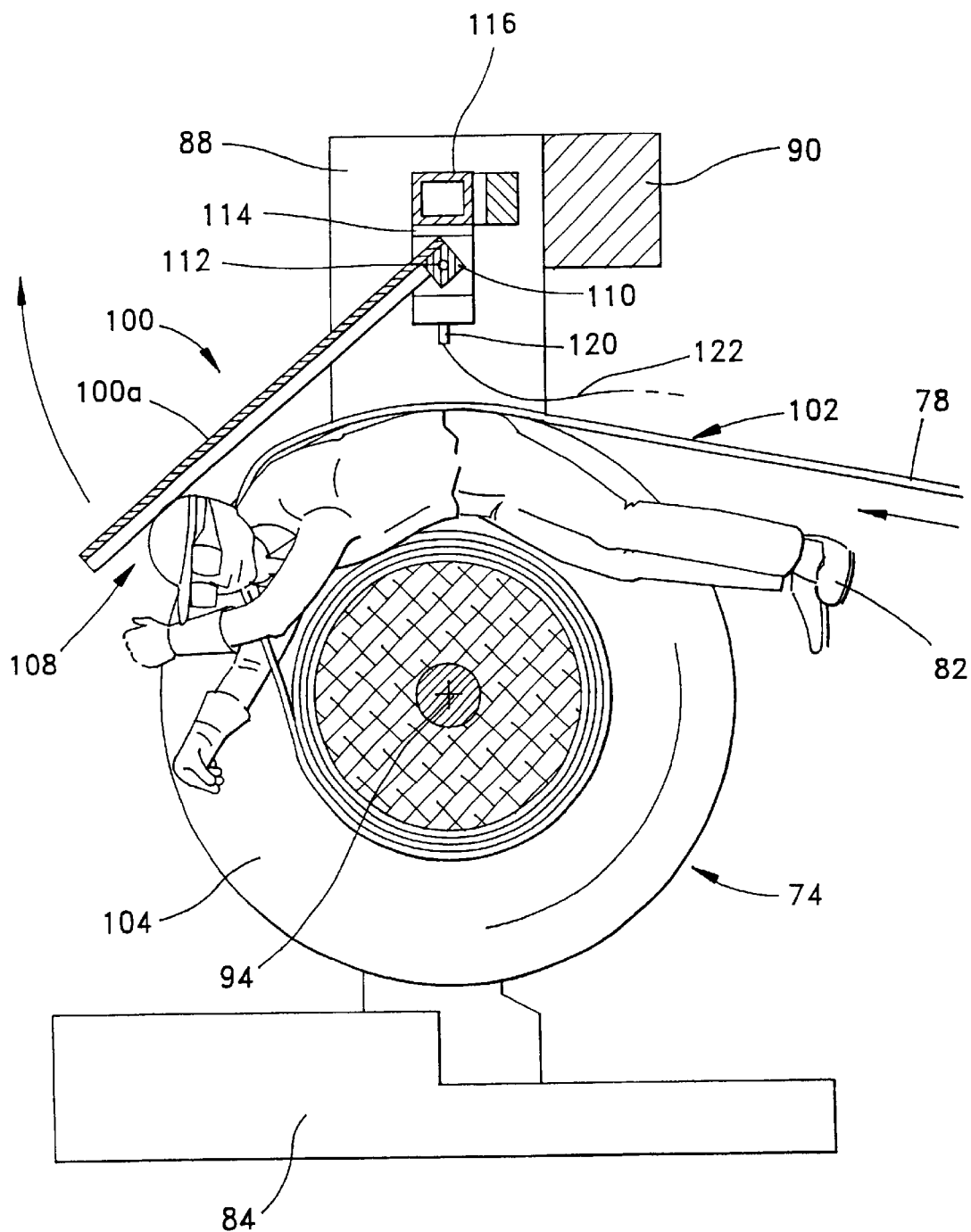
FIG. 11 is a side view showing an operator having been caught under the cable and illustrating how the detector assembly has moved to a position which can cause a reaction controlling the machine, for example, by bringing the machine to an immediate stop.
Figure 17:
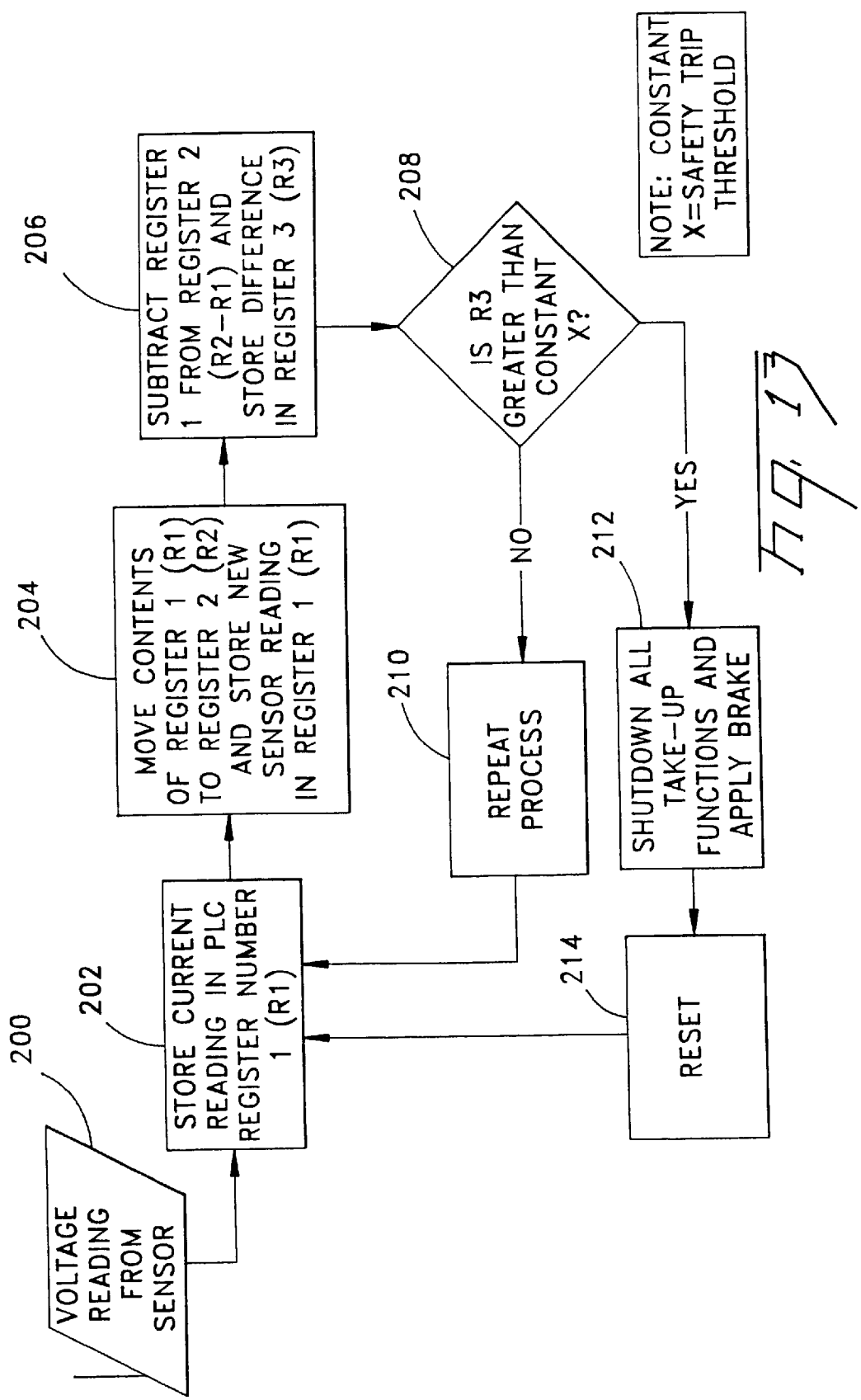

As discussed above, monitoring system 70 may be utilized to, for example, detect an object that may represent a safety-threatening condition. Under normal operating conditions, referring to FIGS. 6 and 10, sensing member 100 is slowly displaced away from axis of rotation 94 by the accumulation of cable 78 around the core of reel 74. The slow displacement of sensing member 100 causes a slow rotation of shaft 112, causing a corresponding slow rotation of cam 118 relative to proximity sensor 120. Proximity sensor 120 may be an induction proximity sensor and cam 118 may comprise a ferrous material, for example. The distance from proximity sensor 120 to cam 118 is proximal distance 128, which changes with the rotation of the cam. The variable value of proximal distance 128 corresponds the variable value of the position signal sent from proximity sensor 120 to PLC 96, indicating the position of sensing member 100 relative to reel 74. Under normal operating conditions, as cam 118 passes over proximity sensor 120, the outer surface of the cam slowly gets closer to the sensor. This creates a very gradual change in proximal distance 128 over time. In contrast, when a safety-threatening condition occurs, referring to FIGS. 11 and 12, such as when operator 82 gets caught in cable 78 and is carried into spooling area 102, then the change in value of proximal distance 128 is very abrupt. A sudden change in proximal distance 128 is evaluated by a PLC 96 as, for example, a safety-threatening condition, resulting in a controlling of motor 98, for example, controlling the torque, speed, or altogether immediately stopping the motor by application of a brake. The present invention is not limited to the exemplary embodiment suggesting a safety issue. In any embodiment of the present invention, the computer or PLC or other control device can be programmed to interpret the presence of an object or operator as part of a non-safety issue event, for example, the event may be related to a machine design, process or control system, or timing means event.

The present invention advantageously allows spooling area 102 to be monitored, including the area between and adjacent to flanges 104 and 106 and adjacent to the core of reel 74. This is particularly important in reels where the difference between the flange radius and reel core radius creates a space between the flanges and adjacent to the core that is large enough for any part of an operator's body to fit in. For example, reels having flanges having a difference between the flange radius and core radius in the range of a minimum of about 6" or less to about 24" or more can be a safety hazard. In this situation, conventional photo-detection systems for stopping the rotation of the reel are ineffective because they cannot be implemented in the area between the flanges. In contrast, the present invention is able to monitor at least portions of this area. Therefore, the present invention can meet safety concerns by monitoring the spooling area between and adjacent to the spooling area.

In one embodiment, referring to FIG. 13, the method according to the present invention for controlling the reeling machine by, for example, automatically stopping reeling machine 76 due to a safety-threatening condition, include generating the position signal corresponding to proximal distance 128, which is typically a voltage reading, from proximity sensor 120 (block 200). PLC 96 receives the position signal and stores it in memory as the current position signal (block 202). The current position signal is stored by moving a previously received position signal from a first register to a second register and storing the current position signal in the first register (block 204). The values of the position signals in the first and second registers are then compared, and the difference of these values is stored in a third register (block 206). The position signal difference value from the third register is compared to a constant x, where x is a predetermined safety threshold (block 208). If the value in the third register is less than or equal to the safety threshold, then the process is repeated (block 210). If the value in the third register is greater than the safety threshold, then the shut down signal is sent and shut down functions are initiated (block 212). Once the shut down has occurred, the system is reset and the process is reinitiated (block 214). This is but one method to utilize the data monitored and generated by the present invention to detect a safety-threatening position, and one skilled in the art will realize other similar methods.

Thus, the present invention includes reel monitoring systems and methods for detecting at least one object, surface, and/or an operator adjacent to a reel. The systems and methods detect the presence and/or position of any objects in and/or adjacent to the spooling area. A computer can control the operation of the reel, for example, by measuring the amount of cable on the reel, or by controlling the speed, or torque of the motor, and/or sending a stop signal to the reeling machine to stop rotation of the reel. Control can be triggered by a position change that is greater than a predetermined maximum position change value. The predetermined maximum position change value may be a safety-threshold value, indicating a safety-threatening condition, or it may be a non-threatening condition, for example, a reel capacity threshold value, indicating when the cable has filled or been emptied from the reel. Thus, the present invention is able to monitor the spooling area of a rotatable reel and control rotation of the reel. A computer is not necessarily required in the present invention as a direct control mechanism or electro-mechanism can be operatively associated with the reeling machine. For example, electro-mechanical devices can be used to control the rotation of the reel by controlling power to the motor and/or the application of brakes. As an illustration, the present invention can include a conventional switch that cuts off power to the motor or activates the braking system, or an rpm sensor with a proximity switch. The projection need not be rigid or semi-rigid, but a lanyard projection connected to a pull switch can be used. Moreover, the movable carriage can comprise any electrical, pneumatic, and/or mechanical motion actuation device transnational or rotational.

Although the invention has been described with reference to these preferred embodiments, other embodiments can achieve the same results. As such, variations and modifications of the present invention will be apparent to one skilled in the art and the following claims are intended to cover all such modifications and equivalents.

Accordingly, what is claimed is:

1. A cable winding or pay-off device, comprising:
   a frame having a first and second leg and a cross-beam connecting the top ends of each of said first and second leg;
   a mount affixed between each of said first and second leg, said mount adapted for releasably and rotatably securing a reel for winding or paying off cable, said reel having a core longitudinally extending between a first and second flange;
   a motor adapted for rotating said reel;
   an arm longitudinally extendible between said flanges and contactable with said reel or with said cable wound about said reel, said arm being translatable in a direction generally parallel with respect to said core of said reel;
   a sensor coupled to said arm, said sensor adapted to detect the rotational position of said arm relative to the rotational axis of said reel and to output a position signal representative of said rotational position; and
   a controller having a memory and a processor, said controller adapted to receive said position signal and said processor adapted to compare said position signal to a previously received position signal stored in said memory to determine a rotational position change value of said arm, wherein said controller is adapted to output a position change signal representative of said rotational position change value.

2. A device as recited in claim 1, wherein said arm further comprises a plurality of members spaced apart between said flanges.

3. A device as recited in claim 1, wherein said sensor comprises a proximity sensor.

4. A device as recited in claim 3, further comprising:
   a rotatable shaft attached to said arm; and
   a cam attached to said shaft adjacent to said sensor and defining a proximal distance between said cam and said sensor, wherein displacement of said arm rotates said shaft and said cam and changes the value of said proximal distance, and wherein said proximal distance value is converted into said position signal.

5. A device as recited in claim 4, wherein said cam comprises a material having ferrous properties and wherein said sensor comprises an induction proximity sensor.

6. A device as recited in claim 1, wherein said processor compares said rotational change value to a maximum rotational change value, and wherein said processor send a shut down signal to stop rotation of said reel if said rotational change value exceeds said maximum rotation change value.

7. A device as recited in claim 1, wherein said processor utilizes said rotational change value to determine an amount of said cable remaining on said reel.

8. A device as recited in claim 1, wherein said processor utilizes said rotational change value to adjust a rotational speed and a torque of said reel.

9. A method for automatically controlling a machine that rotates a reel for winding or unwinding cable, comprising:
   detecting the presence and position of an object between a pair of flanges of the reel relative to the rotational axis of the reel with an arm longitudinally extendible between the flanges and outputting a position signal indicating the detected presence and position;
   comparing the position signal to a previously-received position signal stored in a memory of a controller using a processor associated with the controller in order to determine a position change value; and
   sending an output signal to the machine to control the reel.

10. A method as recited in claim 9, wherein the output signal comprises an amount of cable on the reel based on position change value.

11. A method as recited in claim 9, further comprising comparing a first detection time associated with the previously-received position signal to a second detection time associated with the position signal to determine a detected time period, and sending an output signal to stop rotation of the reel if the detected time period is less than an expected time period, wherein the expected time period is determined based on the position change value and normal operating conditions of the reel.

12. A device for monitoring an area between and adjacent to flanges of a rotatable reel adapted for winding-up or paying off an elongate material, comprising:
   said rotatable reel being operatively associated with a drive system for driving rotation of said reel about an axis of rotation and having a spooling area for receiving the elongated material;
   an arm longitudinally extendible into said area between said flanges and displaceable relative to the rotational axis of said reel;
   a sensor adapted to detect a position of said arm and to output a plurality of position signals, said plurality of position signals at least including a first position signal detected at a first time and a second position signal detected at a second time;
   a controller for receiving said position signal from said sensor to determine a change in position of said arm relative to said rotational axis, said controller having a memory, for storing at least one of said plurality of position signals, and a processor, for comparing at least said second position signal to said first position signal to determine a position change value over a time period, wherein said time period is the difference between said first time and said second time, and wherein said controller is adapted to output a position change signal representative of said position change value.

13. A device as recited in claim 12, said arm being translatable in a direction generally parallel with respect to said core of said reel.

14. A device as recited in claim 12, said arm further comprises a plurality of members spaced apart between said flanges.

* * * * *